United States Patent
Zhou et al.

(10) Patent No.: US 9,363,162 B1
(45) Date of Patent: Jun. 7, 2016

(54) DETERMINING WCMP LINK CAPACITIES IN MULTI-STAGE NETWORKS

(71) Applicant: Google Inc., Mountain View, CA (US)

(72) Inventors: Junlan Zhou, Mountain View, CA (US); Arjun Singh, Mountain View, CA (US); Amin Vahdat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 14/059,015

(22) Filed: Oct. 21, 2013

(51) Int. Cl.
*H04J 1/16* (2006.01)
*H04L 12/721* (2013.01)

(52) U.S. Cl.
CPC .................................. *H04L 45/123* (2013.01)

(58) Field of Classification Search
CPC .................................................... H04L 45/123
USPC .................................. 370/237, 238, 401, 400
See application file for complete search history.

(56) References Cited

U.S. PATENT DOCUMENTS

| | | | | |
|---|---|---|---|---|
| 4,991,168 A * | 2/1991 | Richards | | 370/381 |
| 6,594,261 B1 * | 7/2003 | Boura et al. | | 370/389 |
| 6,735,172 B1 * | 5/2004 | Gibbs et al. | | 370/235 |
| 7,898,959 B1 * | 3/2011 | Arad | | 370/235 |
| 7,984,151 B1 * | 7/2011 | Raz et al. | | 709/226 |
| 8,160,063 B2 | 4/2012 | Maltz et al. | | |
| 8,370,496 B1 * | 2/2013 | Marr | | 709/226 |
| 8,533,354 B1 * | 9/2013 | Colwell | | 709/231 |
| 8,850,055 B1 * | 9/2014 | Mani et al. | | 709/231 |
| 8,971,274 B1 * | 3/2015 | Teller et al. | | 370/329 |
| 9,007,898 B2 * | 4/2015 | Jain et al. | | 370/230 |
| 9,071,541 B2 | 6/2015 | Atlas et al. | | |
| 9,137,324 B2 | 9/2015 | Ims et al. | | |
| 2002/0103924 A1 * | 8/2002 | Nomura | | 709/235 |
| 2004/0010577 A1 * | 1/2004 | Yegenoglu | | 709/223 |
| 2006/0159021 A1 * | 7/2006 | Asghar et al. | | 370/237 |
| 2008/0188231 A1 * | 8/2008 | Zhu et al. | | 455/450 |
| 2010/0149988 A1 * | 6/2010 | Matsubara et al. | | 370/237 |
| 2010/0226251 A1 * | 9/2010 | Imai et al. | | 370/235 |
| 2011/0087799 A1 * | 4/2011 | Padhye et al. | | 709/235 |
| 2011/0116367 A1 * | 5/2011 | Mang et al. | | 370/228 |
| 2011/0267942 A1 * | 11/2011 | Aybay et al. | | 370/230 |
| 2011/0307718 A1 * | 12/2011 | Aybay et al. | | 713/310 |
| 2011/0310739 A1 * | 12/2011 | Aybay | | 370/235 |
| 2012/0201252 A1 * | 8/2012 | Subramanian et al. | | 370/401 |
| 2013/0117466 A1 * | 5/2013 | Hassidim et al. | | 709/235 |
| 2013/0329605 A1 * | 12/2013 | Nakil et al. | | 370/255 |
| 2014/0078904 A1 | 3/2014 | Yu | | |
| 2014/0181298 A1 * | 6/2014 | Wang et al. | | 709/224 |
| 2014/0376546 A1 | 12/2014 | Miller et al. | | |
| 2015/0067086 A1 * | 3/2015 | Adriaens et al. | | 709/212 |

* cited by examiner

*Primary Examiner* — Parth Patel
(74) *Attorney, Agent, or Firm* — Edward A. Gordon; Foley & Lardner LLP

(57) ABSTRACT

Exemplary embodiments determine respective capacities of network links in a multi-stage network. Specifically, the capacities of the upstream links for a given network element are determined based on the capacities of the downstream links for that network element. According to the various embodiments, a network element determines the amount of data, i.e. traffic, which may be assigned to downstream links based on the determined capacities. A network element may not receive more traffic than the total direct downstream capacity of the network element. Thus, optimum throughput may be attained for the entire network.

20 Claims, 11 Drawing Sheets

DETERMINING WCMP LINK CAPACITIES IN MULTI-STAGE NETWORKS

BACKGROUND

In conventional networks, various routing techniques may be used to transport data packets through the network. There may be multiple paths to transport the data packets between two nodes of the network. The network may be configured to split the traffic among these multiple paths. For example, a multipath routing technique may be used to determine how the traffic will be split among the multiple paths in the network. Exemplary multipath routing techniques may include Weighted Cost MultiPath (WCMP) routing and Equal Cost MultiPath (ECMP) routing. WCMP routing technique may distribute the traffic among available paths based on a set of pre-determined ratios. If the pre-determined ratios are equal, the WCMP routing may be a ECMP routing where the traffic is distributed evenly among the available paths. WCMP routing may include multiple links interconnecting network components. Each link may have a maximum capacity for transmitting data.

In conventional networks, a network element assigns data to a given link for transmission to an intended recipient. The data may traverse through multiple network elements at multiple stages before being transmitted to the recipient. The network element transmitting the data may assign the data to the given link based on the maximum capacity of the given link. However, the respective capacities of the network elements downstream from the given link also affect the amount of data that can be transmitted to the intended recipient. Conventional networks fail to consider the capacities of the downstream network elements and/or downstream links when determining the amount of data that can be assigned to a given link.

SUMMARY

Various embodiments provide a computer-implemented method including providing a network comprising a plurality of network devices and a destination. A first network device of the plurality of network devices is provided at a first stage of the network. A second network device of the plurality of network devices is provided at a second stage of the network. The second network device communicates with the first network device and the destination through a plurality of links. The method further includes determining a total bandwidth from the first network device to the second network device and determining the total bandwidth from the second network device to the destination. Respective capacities of the plurality of links between the first network device and the second network device are derived. The method also includes deriving respective capacities of the plurality of links between the second network device and the destination such that, at a given path, total upstream capacity of the second network device is no higher than total downstream capacity of the second network device. A weight associated with respective ones of the plurality of links is calculated based on the derived capacities. Network traffic is distributed among the plurality of links based on the calculated weights.

Some embodiments provide a method including providing a network comprising a plurality of network devices and a destination. A total bandwidth from a network device to another network device or a destination is determined. The method also includes deriving respective capacities of a plurality of links from the network device to the other network device or the destination such that, at a given path, total upstream capacity of the network device is no higher than total downstream capacity of the network device. A weight associated with respective ones of the plurality of links based on the derived capacities is calculated. The method further includes distributing network traffic among the plurality of links based on the calculated weights.

Exemplary embodiments further provide a non-transitory computer-readable medium storing instructions that, when executed on a processor, cause the processor to provide a network comprising a plurality of network devices and a destination. A first network device of the plurality of network devices is provided at a first stage of the network. A second network device of the plurality of network devices is provided at a second stage of the network. The second network device communicates with the first network device and the destination through a plurality of links. The medium further stores instructions that, when executed on the processor, cause the processor to determine a total bandwidth from the first network device to the second network device and determining the total bandwidth from the second network device to the destination. Respective capacities of the plurality of links between the first network device and the second network device are derived. The medium also stores instructions that, when executed on the processor, cause the processor to derive respective capacities of the plurality of links between the second network device and the destination such that, at a given path, total upstream capacity of the second network device is no higher than total downstream capacity of the second network device. A weight associated with respective ones of the plurality of links is calculated based on the derived capacities. Network traffic is distributed among the plurality of links based on the calculated weights.

Various embodiments provide a non-transitory computer-readable medium storing instructions that, when executed on a processor, cause the processor to provide a network comprising a plurality of network devices and a destination. A total bandwidth from a network device to another network device or a destination is determined. The medium also stores instructions that, when executed on the processor, cause the processor to derive respective capacities of a plurality of links from the network device to the other network device or the destination such that, at a given path, total upstream capacity of the network device is no higher than total downstream capacity of the network device. A weight associated with respective ones of the plurality of links based on the derived capacities is calculated. The medium further stores instructions that, when executed on the processor, cause the processor to distribute network traffic among the plurality of links based on the calculated weights.

Exemplary embodiments further provide a system comprising a processor executing instructions to provide a network comprising a plurality of network devices and a destination. A first network device of the plurality of network devices is provided at a first stage of the network. A second network device of the plurality of network devices is provided at a second stage of the network. The second network device communicates with the first network device and the destination through a plurality of links. The processor further executes instructions to determine a total bandwidth from the first network device to the second network device and determining the total bandwidth from the second network device to the destination. Respective capacities of the plurality of links between the first network device and the second network device are derived. The processor also executes instructions to derive respective capacities of the plurality of links between the second network device and the destination such that, at a given path, total upstream capacity of the second network device is no higher than total downstream capacity of the second network device. A weight associated with respective ones of the plurality of links is calculated based on the derived capacities. Network traffic is distributed among the plurality of links based on the calculated weights.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments of the present invention disclosed herein relate to determining respective capacities of network links in a multi-stage network. Specifically, the capacities of the upstream links for a given network element are determined based on the capacities of the downstream links for the given network element. According to the various embodiments discussed herein, the given network element determines the amount of data, i.e. traffic, which may be assigned to downstream links based on the determined capacities. Using the determined capacities of the links, the network may be programmed such that the given network element may not receive more traffic than the total direct downstream capacity of the given network element. Thus, optimum throughput may be attained for the entire network.

Figure 1A:
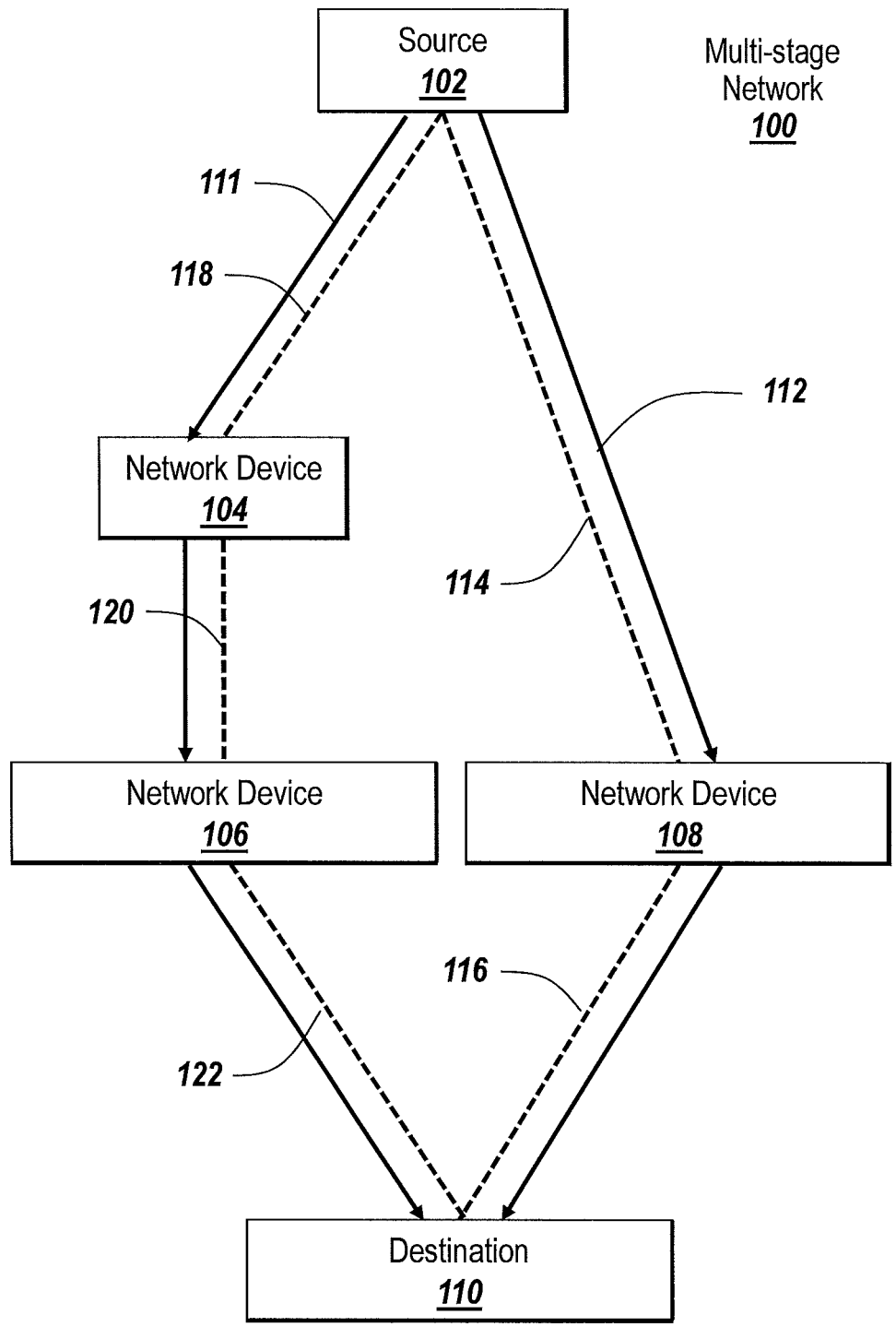
FIG. 1A depicts an exemplary multi-stage network with a plurality of network devices.

According to various embodiments, the network may be a multi-stage network, such as a Clos network. In the multi-stage network, the network elements, e.g. switches, may be connected to each other in stages. FIG. 1A illustrates an exemplary multi-stage network 100. The network 100 may include a source 102, a plurality of network devices and a destination 110. The plurality of network devices may include a first network device 104, a second network device 106 and a third network device 108 provided at different stages. For example, the second network device 106 and the third network device 108 may be provided at a first stage while the first network device 104 may be provided at a second stage. The plurality of network devices may include one or more of a switch, router, server, gateway, bridge, hub, etc. One of ordinary skill in the art will appreciate that the exemplary network 100 may include additional elements, such as additional sources and/or destinations.

As illustrated in FIG. 1A, the source 102 and the destination 110 may be connected via multiple paths 111, 112 that cross through the plurality of network devices. Each path 111, 112 may be formed by one or more links 114, 116, 118, 120, 122. For example, the path 112 illustrated in FIG. 1A is a path to send transmission from the source 102 to the destination 110 via the network device 108. The path 112 may be formed by a first link 114 and a second link 116. A link may be defined as the communication line between two elements in the network. The source 102 may send data packets to the destination 110 using one or more of the multiple paths 111, 112. The network devices 104, 106, 108 in the network 100 may relay the data packets to the next network devices 104, 106, 108 in the network 100. According to the embodiments described herein, the network devices 104, 106, 108 may determine how much data traffic may be forwarded to the next network device 104, 106, 108 based on the upstream capacity of each network device 104, 106, 108. Accordingly, the exemplary embodiments aim at determining the respective capacities of the links interconnecting various elements of the network.

Figure 1B:
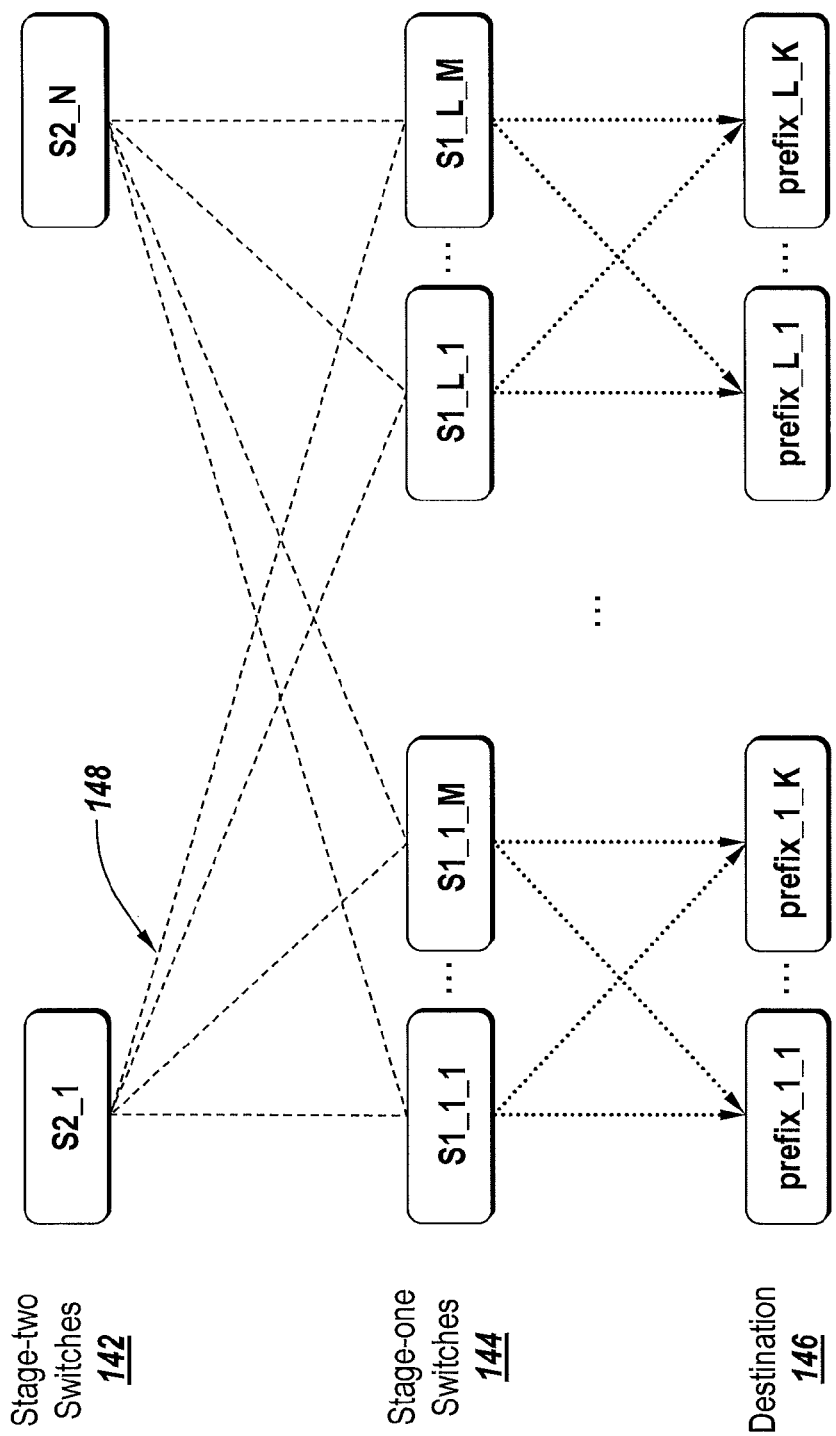
FIG. 1B illustrates a plurality of links between the plurality of network devices and a plurality of destinations in an exemplary multi-stage network.

FIG. 1B illustrates a plurality of links among the plurality of network devices in an exemplary multi-stage network 140. For example, the plurality of network devices may include a plurality of switches provided at two stages in the multi-stage network 140. The exemplary multi-stage network 140 illustrated in FIG. 1B includes a plurality of stage-two S2 switches 142 and a plurality of stage-one S1 switches 144. The stage-one S1 switches 144 may transmit the data packets to the multiple destinations 146. According to various embodiments, the stage-one S1 switches 144 and the destinations 146 may be arranged in groups. For example, as illustrated in FIG. 1B, multi-stage network 140 may include N stage-two S2 switches (S2_1, ..., S2_N), L groups of M stage-one S1 switches (S1_1_1, ..., S_1_M, ..., S1_L_1, ..., S1_L_M) and L groups of K prefixes (prefix_1_1, ..., prefix_1_K, ..., prefix_L_1, ..., prefix_L_K).

In the exemplary multi-stage network 140, each group of stage-one S1 switches 144 may provide a given amount of bandwidth, i.e. data capacity, to a set of destinations 146. For example, each stage-two S2 switch 142 (e.g. S2_1 and S2_N) is connected to one or more stage-one S1 switches 124 (e.g. S1_1_1, S_1_M, S1_L_1, S1_L_M) via zero or more links 148. The connectivity between a stage-two S2 switch 142 and a stage-one S1 switch 144 may be defined by two 3-dimensional arrays R. The bandwidth provided by a stage-one S1 switch 144 to a destination 146 in its group may be defined by a 3-dimensional array C. Accordingly the following notations may be defined:

$R[i][1][m]$: The total capacity between $S1\_i\_1$ to $S2\_m$
$C[i][1][m]$: The capacity between $S1\_i\_1$ to $prefix\_i\_m$ According to various embodiments, all links 148 between a pair of a stage-one S1 switch 144 and a stage-two S2 switch 142 may have one unit of bandwidth. In the multi-stage network 140, different paths between the pair of stage-one S1 switch and the stage-two S2 switch may have variable capacity as a result of a variable number of equal bandwidth links available among the different paths.

In the multi-stage network 140, traffic ingressing a stage-one S1 switch 144 or a stage-two S2 switch 142 may be spread among multiple paths. Each path may transit at a different next-hop stage-two S2 switch 142 or stage-one S1 switch 144 to reach a destination 146. As each path may have a different capacity, WCMP groups may be set up on the stage-one S1 and stage-two S2 switches to implement weighted distribution of the traffic among these paths.

Figure 2A:
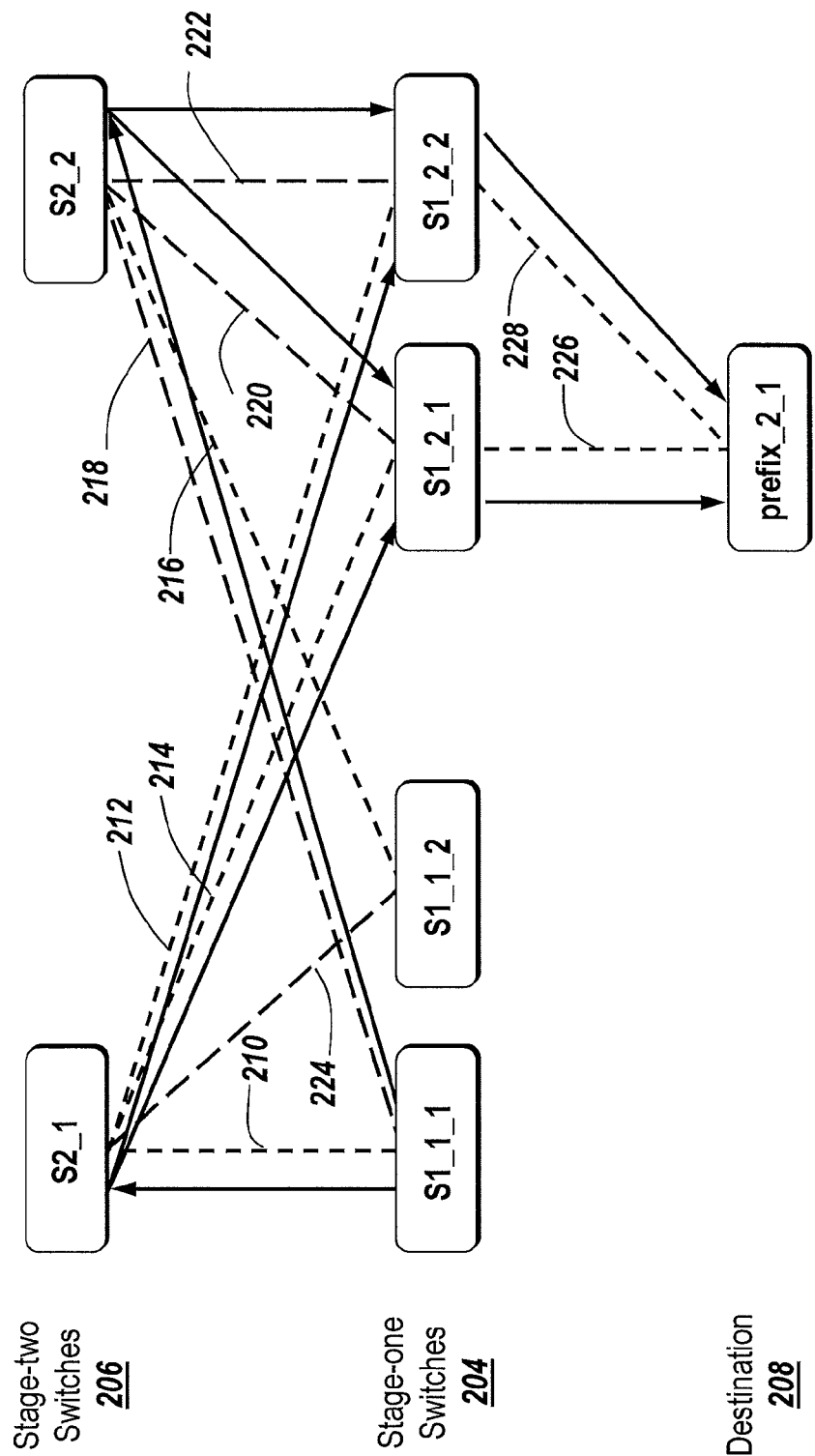
FIGS. 2A-2C illustrates an example for determining capacities of a plurality of links in a multi-stage network including two groups of multi-stage network elements and a destination.
Figure 2B:
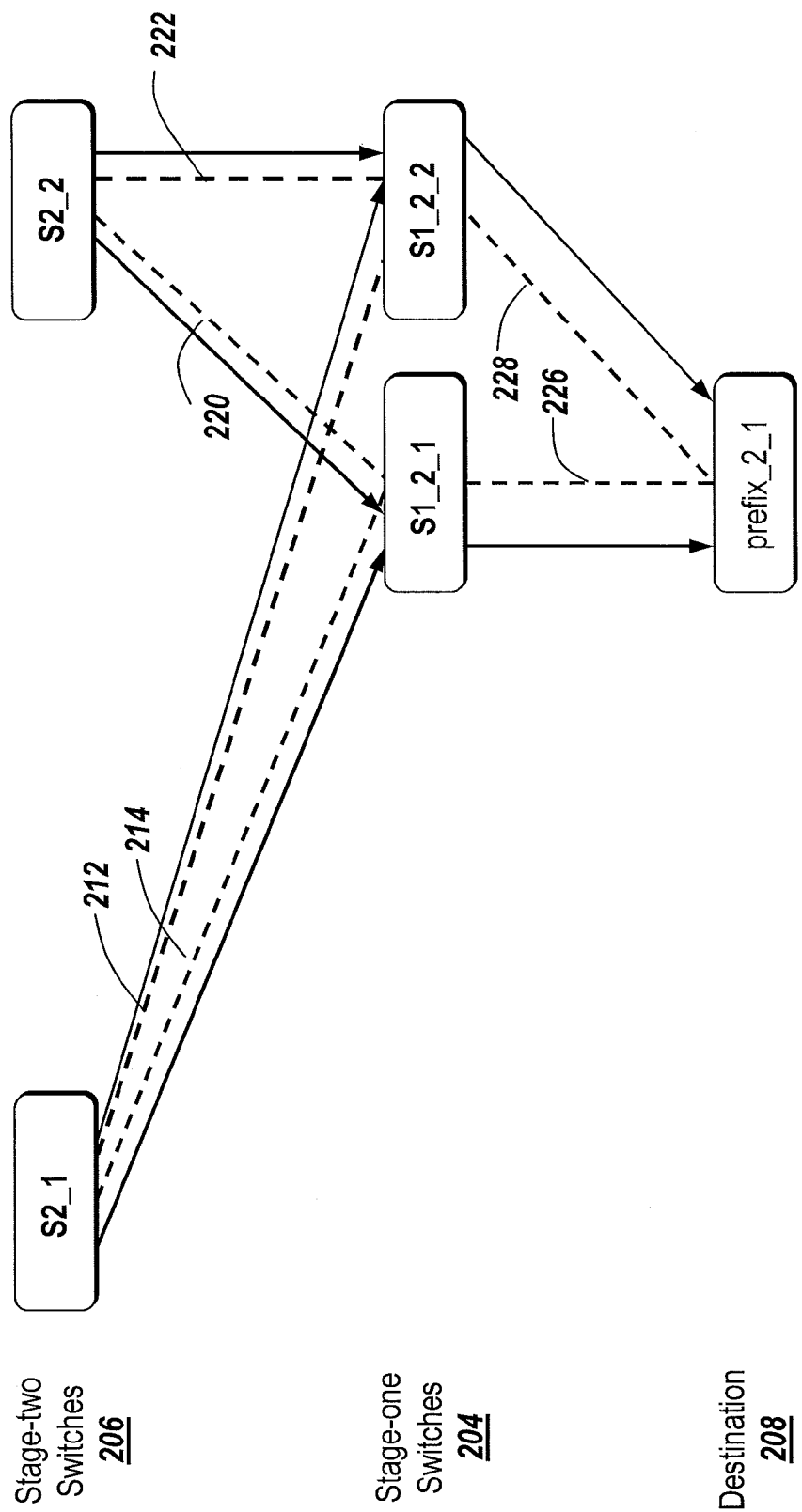
Figure 2C:
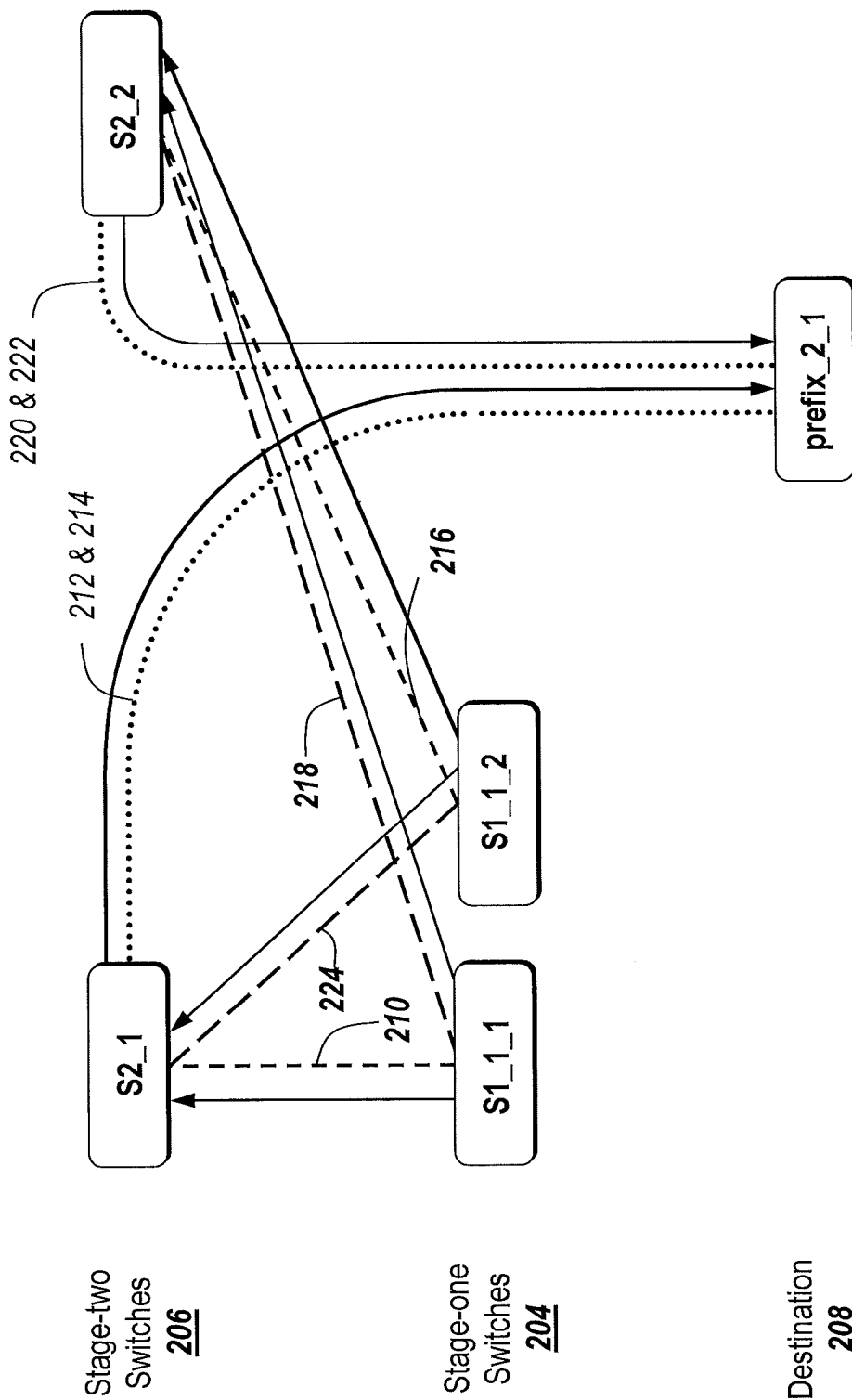

FIGS. 2A-2C illustrate setting up WCMP groups on stage-one S1 and stage-two S2 switches to implement weighted distribution of traffic among paths of a multi-stage network. The exemplary embodiment illustrated in FIGS. 2A-2C determines capacities of a plurality of links 210-228 in the multi-stage network 200.

FIG. 2A shows a multi-stage network 200 comprising four stage-one S1 switches 204 (S1_1_1, S1_1_2, S1_2_1 and S1_2_2) divided into two groups, and two stage-two S2 switches 206 (S2_1 and S2_2) interconnecting the stage-one S1 switches 204. In FIG. 2A, the arrows between the stage-one S1 switches 204 and the stage-two S2 switches 206 illustrate the flow of the data packets, i.e. the traffic flow, between the switches. The dashed lines 210-228 illustrate the plurality of links.

Traffic, e.g. data packets, ingressing the S1_1_1 switch and destined to prefix_2_1 may be spread among many paths transiting to different stage-two S2 switches 206 (S2_1 and S2_2) and remote stage-one S1 switches 204 (S1_2_1 and S1_2_2). In some embodiments, for improved throughput, such traffic may be weighted among the paths in proportion to the respective capacities of the links to prefix_2_1.

In the exemplary embodiment illustrated in FIGS. 2A-2C, links interconnecting the stage-one S1 switches and the stage-two S2 switches may each have a different capacity. For example, the some links having 1G bandwidth capacity may be bundled in sets of three 210, 212, 214, 216 while other links having 1G bandwidth capacity may be bundled in sets of two 218, 220, 222, 224. Accordingly, the total bandwidth out of the S2_1 switch is determined by the sum of bandwidths of links 210, 212, 214, 224 which results in 3G+3G+3G+2G=11G. The total bandwidth out of the S2_2 switch is determined by the sum of bandwidths of links 216, 218, 220, 222 3G+2G+2G+2G=9G. The total bandwidth from the S1_2_1 switch to prefix_2_1 is determined by the bandwidth of link 226 which is 4G. The total bandwidth from the S1_2_2 switch to prefix_2_1 is determined by the bandwidth of link 228 which is 6G.

FIGS. 2B-2C illustrate determining the capacities of the links 210-228 iteratively.

FIG. 2B illustrates determining the capacity of the stage-two S2 switches 206 to the destination 208. As illustrated in FIG. 2B, there are two paths from each stage-two S2 switch 206 to destination 208. Each path transits at a different stage-one S1 switch 204 directly connected to destination 208. Further, the capacity between a stage-one S1 switch 204, such as S1_2_1, and destination 208 is shared by the upstream stage-two S2 switches 206 injecting the traffic to S1_2_1. For example, the capacity of a stage-two S2 switch 206 to destination 208 via a given stage-one S1 switch is proportional to, and no higher than the capacity of the stage-two S2 switch to the given stage-one S1 switch.

For example, the capacity of S2_1, to prefix_2_1 via S1_2_1 is proportional to, and no higher than the capacity of S2_1 to S1_2_1. The capacity of the link 226 from S1_2_1 to prefix_2_1, which is 4G, will be shared among the traffic coming from both S2_1 and S2_2. The total amount of incoming traffic to S1_2_1 thus should not exceed 4G. If the links 214 and 220 connecting the stage-two S2 switches 206 to S1_2_1 are used to their maximum capacity, a total amount of 5G may be sent to S1_2_1. However, only 4G of this incoming traffic can be forwarded to prefix_2_1. Thus, the capacities of the links 214 and 220 should be determined in light of the capacity of the downstream link 226. The link 214 is a bundle of three individual links. The link 220 is a bundle of two individual links. Thus, if the allowable capacity of 4G is divided equally among each individual link, each individual link will get a bandwidth allowance of $4 \times 1/5 = 4/5$. Since the link 214 (between S2-1 and S1_2_1) is a bundle of three individual links, link 214 will be allocated the minimum of $3 \times 4/5$ or 3G (which is the maximum allowable bandwidth for link 214). Thus, link 214 will be allocated a bandwidth of $12/5 = 2.4G$. Similarly, since the link 220 (between S2-2 and S1_2_1) is a bundle of two individual links, link 220 will be allocated the minimum of $2 \times 4/5$ or 2G (which is the maximum allowable bandwidth for link 220). Thus, link 220 will be allocated a bandwidth of $8/5 = 1.6G$.

The same calculations may be applied to path from stage-two switch S2_2 to prefix_2_1 via stage-one switch S1_2_2. The capacity of the link 228 from S1_2_2 to prefix_2_1, which is 6G, will be shared among the traffic coming from both S2_1 and S2_2. The total amount of incoming traffic to S1_2_2 thus should not exceed 6G. If the links 212 and 222 connecting the stage-two S2 switches 206 to S1_2_2 are used to their maximum capacity, a total amount of 5G may be sent to S1_2_2. Since the allowable amount of incoming traffic to S1_2_2 is 6G, the links 212 and 222 may be used to their maximum capacities. The link 212 is a bundle of three individual links. The link 222 is a bundle of two individual links. Thus, if the allowable capacity of 6G is divided equally among each individual link, each individual link will get a bandwidth allowance of $6 \times 1/5 = 6/5$. Since the link 212 (between S2_1 and S1_2_2) is a bundle of three individual links, link 212 will be allocated the minimum of $3 \times 6/5$ or 3G (which is the maximum allowable bandwidth for link 212). Thus, link 212 will be allocated a bandwidth of 3G. Similarly, since the link 222 (between S2_2 and S1_2_2) is a bundle of two individual links, link 222 will be allocated the minimum of $2 \times 6/5$ or 2G (which is the maximum allowable bandwidth for link 220). Thus, link 222 will be allocated a bandwidth of 2G.

Therefore, the capacity from the stage-two S2 switches 206 to destination 208 via different paths can be determined as follows:

| REFERENCE NUMERAL IN FIG. 2B | FROM S2 SWITCH | VIA S1 SWITCH | TO DESTINATION | CAPACITY OF THE LINK |
|---|---|---|---|---|
| 214 | S2_1 | S1_2_1 | prefix_2_1 | $\min(3, 3 \times 4/5) = 2.4$ G |
| 212 | S2_1 | S1_2_2 | prefix_2_1 | $\min(3, 3 \times 6/5) = 3$ G |
| 220 | S2_2 | S1_2_1 | prefix_2_1 | $\min(2, 2 \times 4/5) = 1.6$ G |
| 222 | S2_2 | S1_2_2 | prefix_2_1 | $\min(2, 2 \times 6/5) = 2$ G |

The aggregate capacity from S2_1 to prefix_2_1 is thus 5.4G (2.4G+3G). The aggregate capacity from S2_2 to prefix_2_1 is 3.6G (1.6G+2G).

Since the link 214 from S2_1 to S1_2_1 is a bundle of three links, each individual link of link 214 will be assigned a capacity of 2.4G/3=0.8G. The link 220 from S2_2 to S1_2_1 is a bundle of two links, each individual link of link 220 will be assigned a capacity of 1.6G/2=0.8G. The link 212 from S2_2 to S1_2_1 is a bundle of three links, each individual link of link 212 will be assigned a capacity of 3G/3=1G. The link 222 from S2_2 to S1_2_2 is a bundle of two links, each individual link of link 222 will be assigned a capacity of 2G/2=1G. WCMP group at each of S2_1 and S2_2 may be set up to implement weighted distribution of traffic to prefix_2_1, as follows:

| BUNDLE LINK/ WCMP GROUP | INDIVIDUAL LINK | TO STAGE-ONE SWITCH | CAPACITY OF THE LINK |
|---|---|---|---|
| 214 | Downlink1 | S1_2_1 | 0.8 G |
|  | Downlink2 | S1_2_1 | 0.8 G |
|  | Downlink3 | S1_2_1 | 0.8 G |
| 212 | Downlink1 | S1_2_2 | 1 G |
|  | Downlink2 | S1_2_2 | 1 G |
|  | Downlink3 | S1_2_2 | 1 G |
| 220 | Downlink1 | S1_2_1 | 0.8 G |
|  | Downlink2 | S1_2_1 | 0.8 G |
| 222 | Downlink1 | S1_2_2 | 1 G |
|  | Downlink2 | S1_2_2 | 1 G |

Next, the capacities of the different paths from S1_1_1 and S1_1_2 to prefix_2_1 are determined using the previously derived capacity from the transit stage-two S2 switches to the same destination, i.e. prefix_2_1. FIG. 2C illustrates determining the capacities of the uplinks 210, 218, 216, 224 from S1_1_1 and S1_1_2 to prefix_2_1 via S2_1 and S2_2.

Similarly as above, the capacity of a given stage-two S2 switch to the destination is shared among stage-one S1 switches in proportion to the capacity between these stage-one switches to the given stage-two switch. That is, the aggregate capacity from S2_1 to prefix_2_1, which is 5.4G, will be shared among the traffic coming from both S1_1_1 and S1_1_2 to S2_1. The total amount of incoming traffic to S2_1 thus should not exceed 5.4G. The total bandwidth from the S1_1_1 switch to S2_1 is determined by the bandwidth of link 210 which is 3G. The total bandwidth from the S1_1_2 switch to S2_1 is determined by the bandwidth of link 224 which is 2G. If the links 210 and 224 connecting the stage-one S1 switches 204 to S2_1 are used to their maximum capacity, a total amount of 5G may be sent to S2_1. Since the allowable amount of incoming traffic to S2_1 is 5.4G, the links 210 and 224 may be used to their maximum capacities.

The foregoing type of calculations may be applied to the incoming traffic to S2_1 to determine the capacities between the stage-one S1 switches 204 and S2_1. The link 210 is a bundle of three individual links. The link 224 is a bundle of two individual links. Thus, if the allowable capacity of 5.4G is divided equally among each individual link, each individual link will get a bandwidth allowance of $5.4 \times 1/5 = 5.4/5$. Since the link 210 (between S1_1_1 and S2_1) is a bundle of three individual links, link 210 will be allocated the minimum of $3 \times 5.4/5$ or 3G (which is the maximum allowable bandwidth for link 210). Thus, link 210 will be allocated a bandwidth of 3G. Similarly, since the link 224 (between S1_1_2 and S2_1) is a bundle of two individual links, link 224 will be allocated the minimum of $2 \times 5.4/5$ or 2G (which is the maximum allowable bandwidth for link 224). Thus, link 224 will be allocated a bandwidth of 2G.

The same calculations may be applied to path from stage-one switch S1_1_2 to prefix_2_1 via S2_2. The capacity of S1_1_2 to prefix_2_1 via S2_2 is proportional to, and no higher than the capacity of S1_1_2 to S2_2. The aggregate capacity from S2_2 to prefix_2_1, which is 3.6G, will be shared among the traffic coming from both S1_1_1 and S1_1_2 to S2_2. The total amount of incoming traffic to S2_2 thus should not exceed 3.6G. The total bandwidth from the S1_1_1 switch to S2_2 is determined by the bandwidth of link 218 which is 2G. The total bandwidth from the S1_1_2 switch to S2_2 is determined by the bandwidth of link 216 which is 3G. If the links 216 and 218 connecting the stage-one S1 switches 204 to S2_2 are used to their maximum capacity, a total amount of 5G may be sent to S2_1. However, only 3.6G of this incoming traffic can be forwarded to prefix_2_1. Thus, the capacities of the links 216 and 218 should be determined in light of the capacity of the downstream link from S2_2 to prefix_2_1. The link 216 is a bundle of three individual links. The link 218 is a bundle of two individual links. Thus, if the allowable capacity of 3.6G is divided equally among each individual link, each individual link will get a bandwidth allowance of $3.6 \times 1/5 = 3.6/5$. Since the link 216 (between S1_1_2 and S2_2) is a bundle of three individual links, link 216 will be allocated the minimum of $3 \times 3.6/5$ or 3G (which is the maximum allowable bandwidth for link 216). Thus, link 216 will be allocated a bandwidth of $3 \times 3.6/5 = 2.16G$. Similarly, since the link 218 (between S1_1_1 and S2_2) is a bundle of two individual links, link 218 will be allocated the minimum of $2 \times 3.6/5$ or 2G (which is the maximum allowable bandwidth for link 218). Thus, link 218 will be allocated a bandwidth of $2 \times 3.6/5 = 1.44G$.

Therefore, the capacity from the stage-two S1 switches 204 to destination 206 via different paths can be determined as follows:

| REFERENCE NUMERAL IN FIG. 2C | FROM S1 SWITCH | VIA S2 SWITCH | TO DESTINATION | CAPACITY OF THE LINK |
|---|---|---|---|---|
| 210 | S1_1_1 | S2_1 | prefix_2_1 | min(3, 3 × 5.4/5) = 3 G |
| 216 | S1_1_2 | S2_2 | prefix_2_1 | min(3, 3 × 3.6/5) = 2.16 G |
| 218 | S1_1_1 | S2_2 | prefix_2_1 | min(2, 3 × 5.4/5) = 1.44 G |
| 224 | S1_1_2 | S2_1 | prefix_2_1 | min(2, 2 × 6/5) = 2 G |

The aggregate capacity from stage-one S1 switches to S2_1 is thus 5G (3G+2G). The aggregate capacity from stage-one S1 switches to S2_2 is 3.6G (1.44G+2.16G).

Since the link 210 from S1_1_1 to S2_1 is a bundle of three links, each individual link of link 210 will be assigned a capacity of 3G/3=1G. The link 218 from S1_1_1 to S2_2 is a bundle of two links, each individual link of link 218 will be assigned a capacity of 1.44G/2=0.72G. The link 216 from S1_1_2 to S2_2 is a bundle of three links, each individual link of link 216 will be assigned a capacity of 2.16G/3=0.72G. The link 224 from S1_1_2 to S2_1 is a bundle of two links, each individual link of link 224 will be assigned a capacity of 2G/2=1G. WCMP group at each of S1_1_1 and S1_1_2 may be set up to implement weighted distribution of traffic to prefix_2_1, as follows:

| BUNDLE LINK/ WCMP GROUP | INDIVIDUAL LINK | TO STAGE-TWO SWITCH | CAPACITY OF THE LINK |
|---|---|---|---|
| 210 | Uplink1 | S2_1 | 1 G |
|  | Uplink2 | S2_1 | 1 G |
|  | Uplink3 | S2_1 | 1 G |
| 216 | Uplink1 | S2_2 | 0.72 G |
|  | Uplink2 | S2_2 | 0.72 G |
|  | Uplink3 | S2_2 | 0.72 G |
| 218 | Uplink1 | S2_2 | 0.72 G |
|  | Uplink2 | S2_2 | 0.72 G |
| 224 | Uplink1 | S2_1 | 1 G |
|  | Uplink2 | S2_1 | 1 G |

As it can be noted from the derived capacities, the total capacity of the link 218 to S2_1 is 1.44G. This is less than the maximum capacity of 2G of the link 218. However, since the switch S2_1 will not be able to transmit all of 2G amount of traffic due to the capacity of the downlink between switch S2_1 and prefix_2_1, there is no point of sending the extra data to the switch S2_1.

Figure 3A:
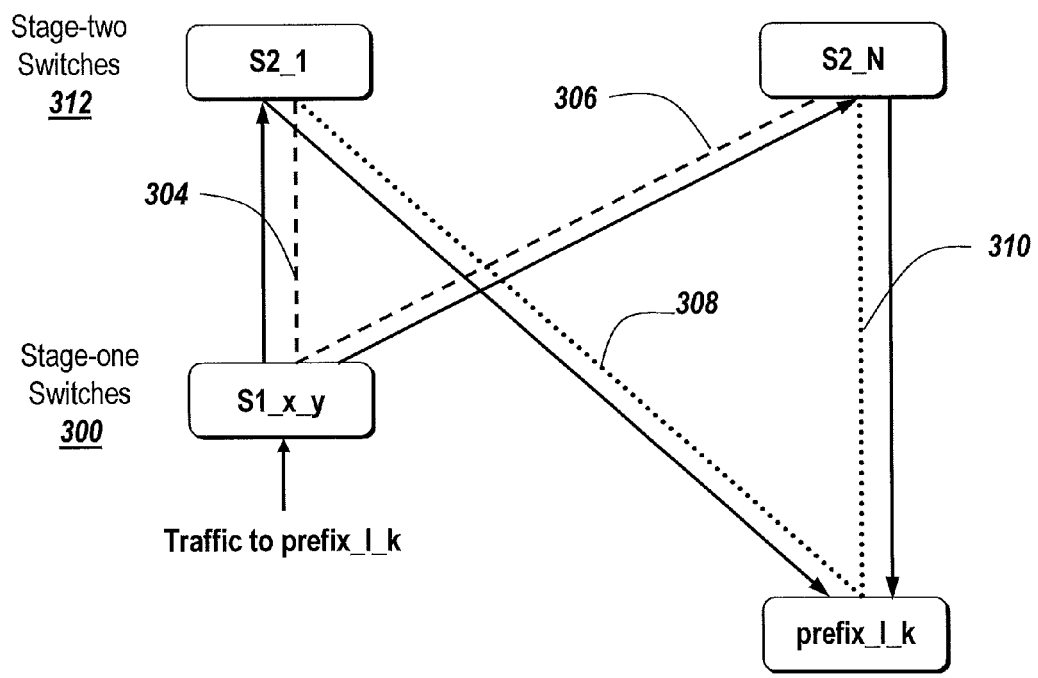
FIGS. 3A-3B illustrate deriving the capacity of one or more links connecting a first-stage network element to the destination via a second-stage network element.
Figure 3B:
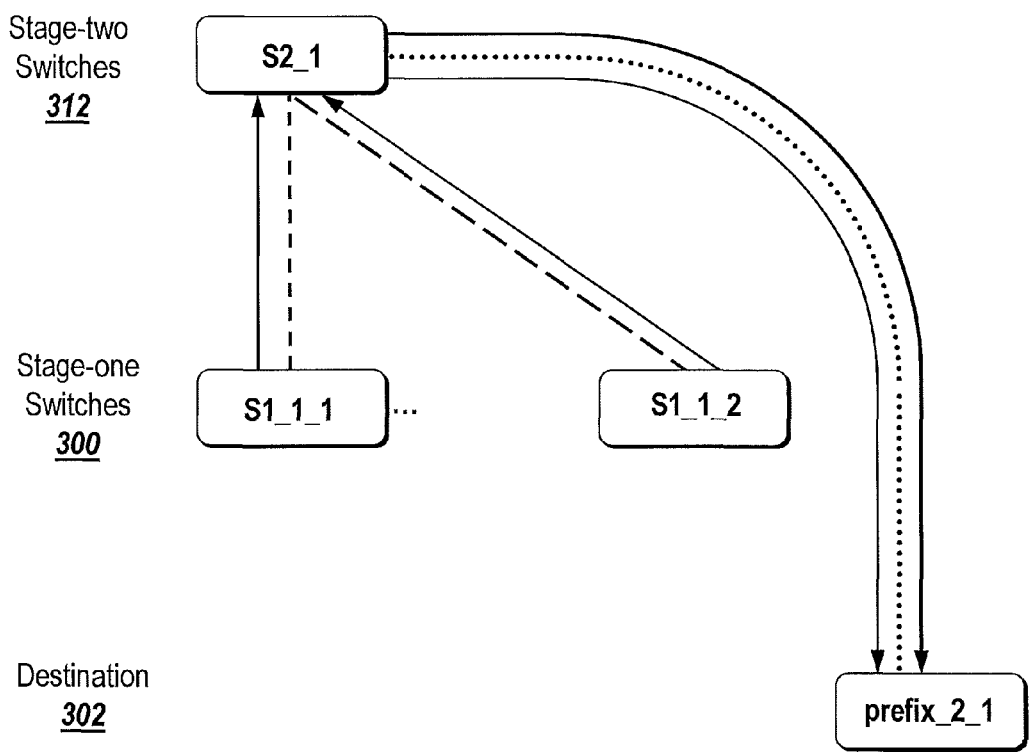

FIGS. 3A-3B illustrate deriving the capacity of one or more links connecting a first-stage network element to the destination via a second-stage network element. After determining the respective capacities of the uplinks and downlinks as discussed above, generalized formulas may be derived for computing a WCMP group on an stage-one S1 switch S1_x_y for a destination prefix_1_k in any given multi-stage network.

As shown in FIGS. 3A-3B, there may exist multiple paths using links 304, 308, 306, 310 from an stage-one S1 switch 300, e.g. S1_x_y, to a destination 302, e.g. prefix_1_k. Each of the paths may transit at a stage-two S2 switch 312, e.g. S2_n where (1<=n<=N). The path transiting at S2_n has a maximum sustainable bandwidth denoted by W(x, y, n)(l, k). To improve throughput and to provide uniform performance to hosts, such traffic must be weighted among the uplinks of the stage-one S1 switch 300, e.g. S1_x_y, in proportion to the sustainable capacity of the corresponding paths to the destination 302, e.g. prefix_1_k. For instance, the uplink from S1_x_y to S2_1 is assigned weight of W(x, y, 1)(l, k)/U(x, y, 1), as the path to prefix_1_k that transit at S2_1 has a sustainable bandwidth denoted as W(x, y, 1)(l, k). Similarly, the uplink from S1_x_y to S2_N is assigned weight of W(x, y, N)(l, k)/U(x, y, N), as the path to prefix_1_k that transit at S2_N has a sustainable bandwidth denoted as W(x, y, N)(l, k) respectively. W(x, y, n)(l, k) may represent the capacity of path from S1_x_y to prefix_1_k that transit at S2_n.

As illustrated in FIG. 3B, a stage-two S2 switch 312, e.g. S2_n, may serve transit traffic from stage-one S1 switches 300, e.g. S1_x_y and S1_1_1, and destined to destination 302, e.g. prefix_1_k. If the total capacity between the stage-two S2 switch 312, e.g. S2_n, and destination 302, e.g. prefix_1_k, is defined as B[n][l][k], such capacity is shared among the set of stage-one S1 switches 300 that are not directly connected to the destination 302 (prefix_1_k) in proportion with the capacity between these stage-one S1 switches 300 and the stage-two S2 switch 312 (S2_n). Thus W(x,y,n)(l,k) can be determined as below:

$$W(x, y, n)(l, k) = \min\left(R[x][y][n], R[x][y][n] \times B[n][l][k] \Big/ \sum_{(i,m)=(1,1) \text{ and } i \neq l}^{(L,M)} R[i][m][n]\right)$$

where B[n][l][k] represents the total capacity between S2_n and prefix_1_k.

Figure 4:
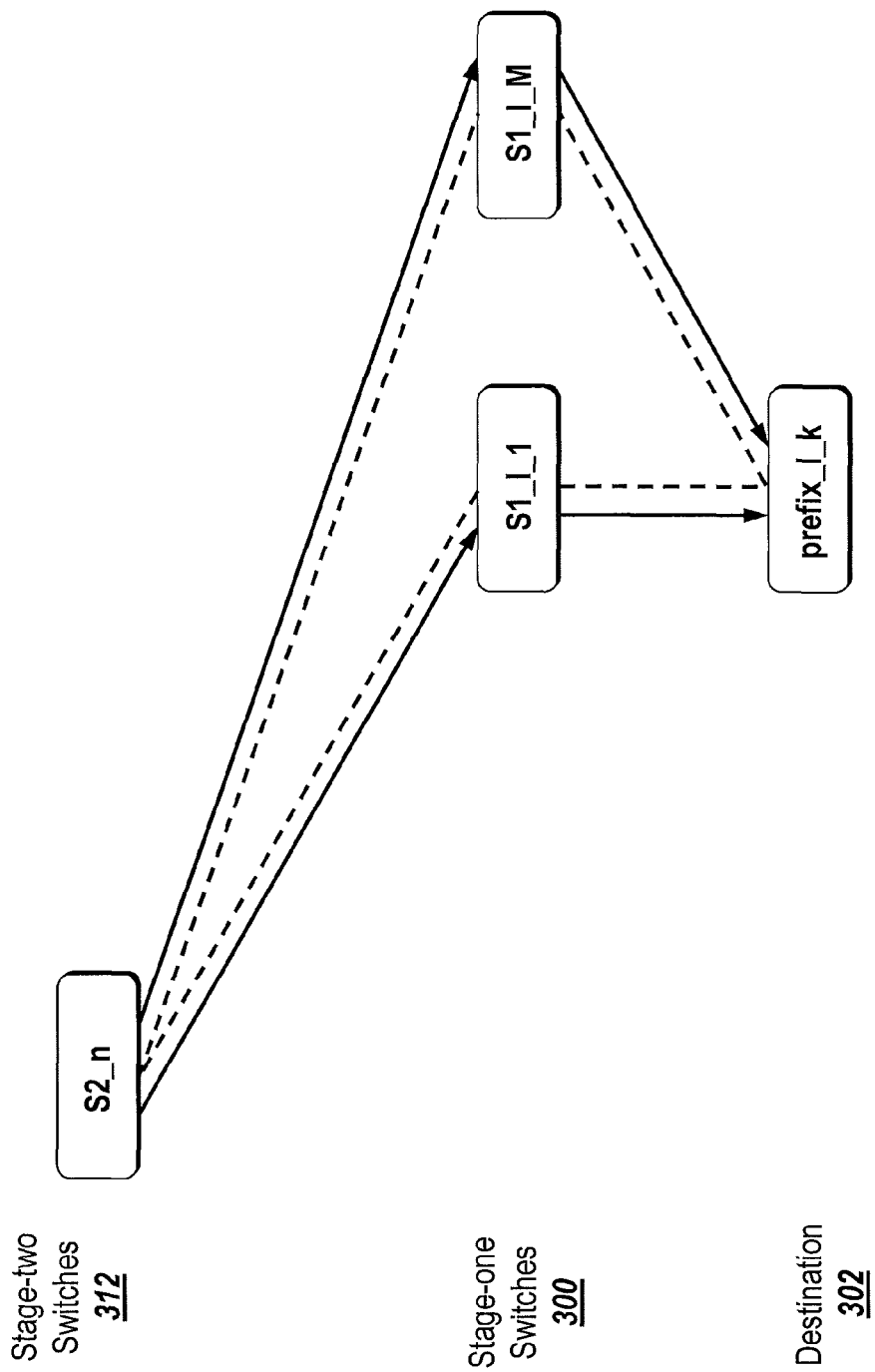
FIG. 4 illustrates deriving the total capacity of the links between a second-stage network element and the destination.

FIG. 4 illustrates deriving the total capacity of the links between a second-stage network element and the destination, i.e. B[n][l][k]. As illustrated in FIG. 4, there may exist multiple paths from a stage-two S2 switch 312, e.g. S2_n, to the destination 302, e.g. prefix_1_k, via different stage-one S1 switches 300 directly connected to the destination 302 (prefix_1_k). B[n][l][k] can be defined as a sum of capacity on the path from the stage-two S2 switch 312 (S2_n) to the destination 302 (prefix_1_k) transiting a stage-one S1 switch 300. That is B[n][l][k] can be defined as:

$$B[n][l][k] = \sum_{i=1}^{M} P[n][i][l][k]$$

where P[n][i][l] [k] represents the total capacity between S2_n and prefix_1_k that transit at S1_1_i.

For improved throughput, weighted distribution may be implemented for traffic on the stage-two S2 switch 312, e.g. S2_n, among the next-hop S1 switches 300 (e.g. S1_L_i, where 1<=i<=M) to the destination 302 (e.g. prefix_1_k). This is achieved by setting up a WCMP group on the stage-two S2 switch 312 (S2_n) including all the downlinks to the stage-one S1 switch S1_1_i (1<=i<=M) as members. Each downlink to the S1 switch S1_1_i may be assigned weight of P[n][i][l][k]/U[l][i][n].

Figure 5:
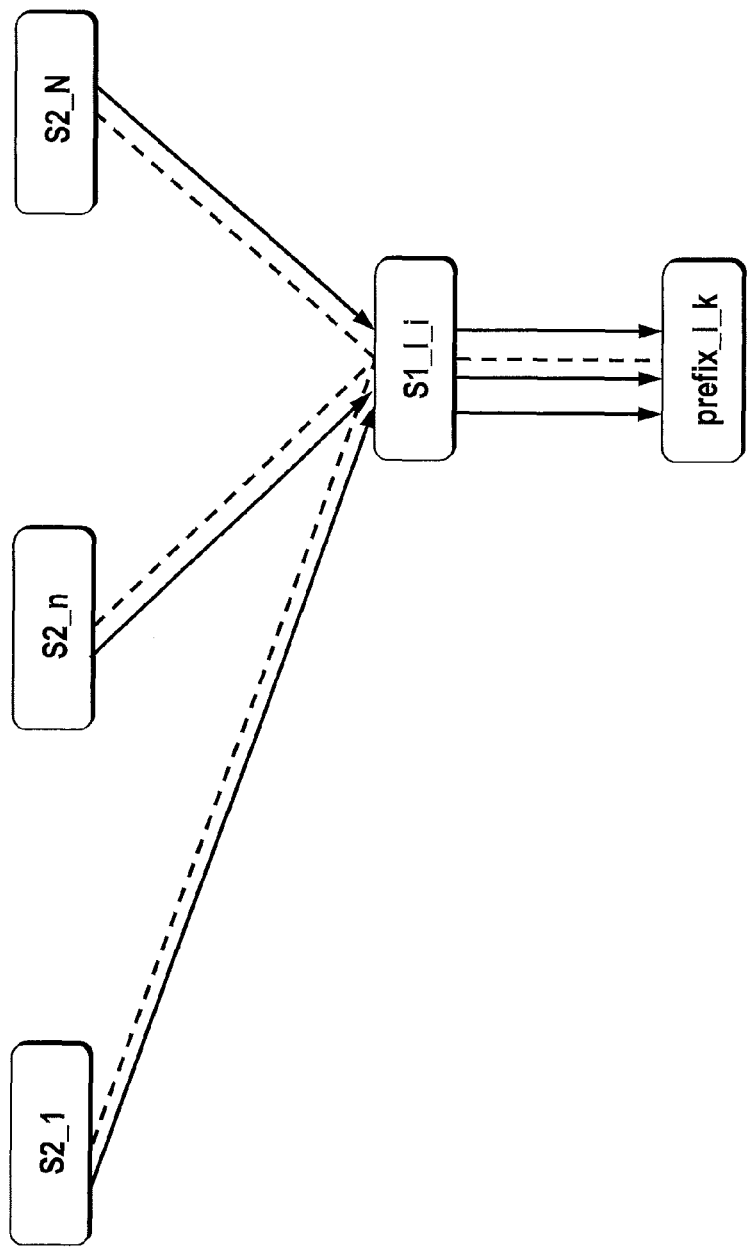
FIG. 5 illustrates deriving the capacity of one or more links connecting a second-stage network element to the destination via a first-stage network element.

FIG. 5 illustrates deriving the capacity of one or more links connecting a second-stage network element to the destination via a first-stage network element, i.e. P[n][i][l][k]. As shown in FIG. 5, the total capacity C[l][i][k] between the stage-one S1 switch S1_L_i and the destination prefix_1_k is shared among all stage-two S2 switches in proportion with the capacity of edge between the stage-two S2 switch and the stage-one S1 switch S1_L_i. P[n][i][l][k] (receiving a portion of C[l][i][k]) can be defined as:

$$P[n][i][l][k] = \min\left(R[l][i][n], R[l][i][n] \times C[l][i][k] \Big/ \sum_{j=1}^{N} R[l][i][j]\right)$$

Figure 6:
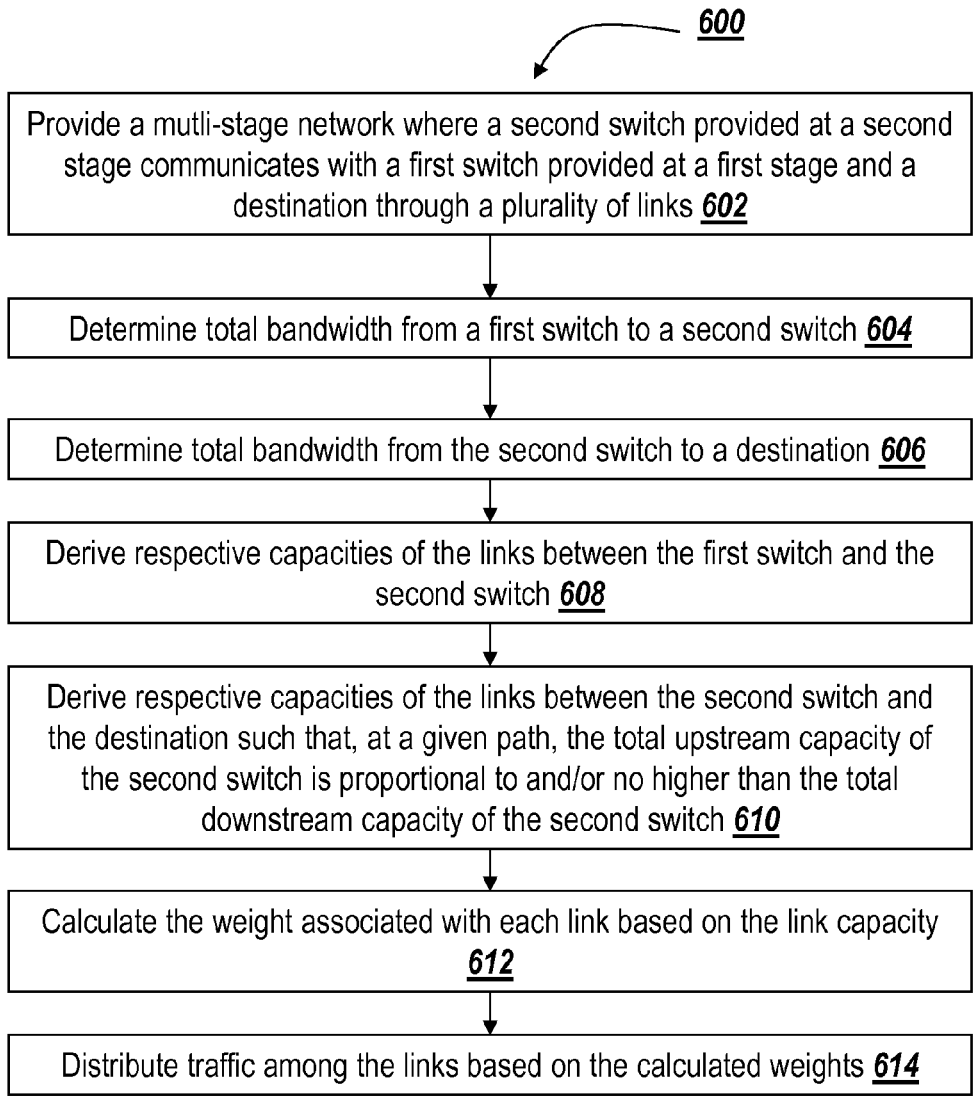
FIG. 6 is a flowchart describing determining capacities of one or more links in a multi-stage network.

FIG. 6 is a flowchart describing determining capacities of one or more links in a multi-stage network. The multi-stage network may include at least one source, a plurality of switches and at least one destination. A first switch may be provided at a first stage of the multi-stage network and a second switch may be provided at a second stage of the multi-stage network. The second switch may communicate with the first switch and the destination through a plurality of links (step 602). According to various embodiments, respective capacities of network links in the multi-stage network may be determined such that the capacities of the upstream links for a given switch are determined based on the capacities of the downstream links for that switch. First, a total bandwidth from a first switch to a second switch may be determined (step 604). Then, a total bandwidth from the second switch to a destination may be determined (step 606). Respective capacities of the links between the first switch and the second switch may be derived (step 608). Respective capacities of the links between the second switch and the destination may be derived such that, at a give path, the total upstream capacity of the second switch is proportional to and/or no higher than the total downstream capacity of the second switch (step 610). The weight associated with each link may be calculated based on the determined link capacities (step 612). The network traffic may be distributed among the links based on the calculated weights (step 614). Using the determined capacities of the links, the network may be programmed such that a switch in the network may not receive more traffic than the total direct downstream capacity of that switch. Thus, optimum throughput may be attained for the entire network.

One or more of the above-described acts may be encoded as computer-executable instructions executable by processing logic. The computer-executable instructions may be stored on one or more non-transitory computer readable media. One or more of the above described acts may be performed in a suitably-programmed electronic device.

Figure 7:
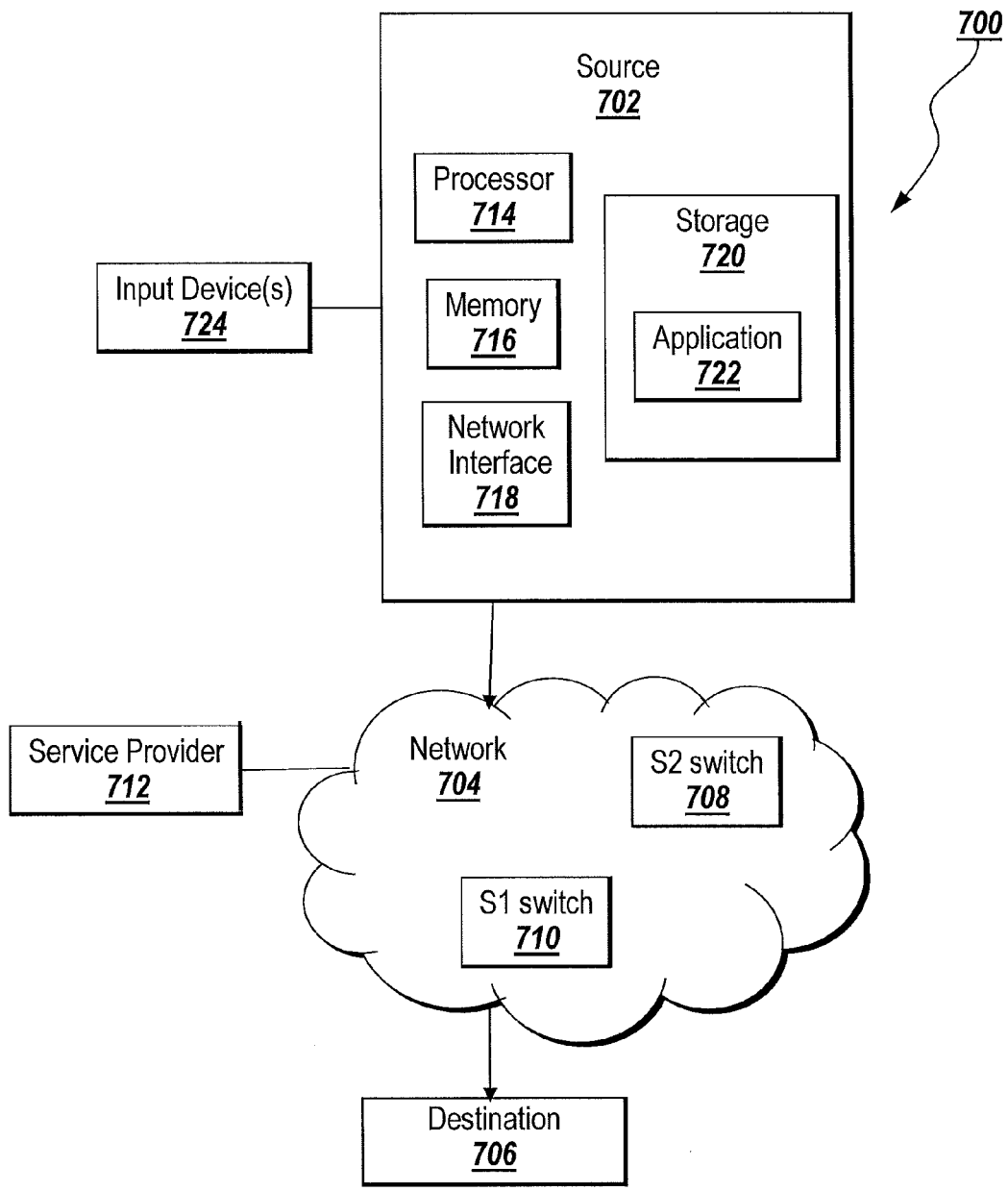
FIG. 7 depicts an exemplary computing device and network implementation of processing performed according to exemplary embodiments described herein.

FIG. 7 illustrates a communication system 700 for conveying a data packet from a source 702 to a specific destination 706 according to the teachings of the present invention. The illustrated system 700 can include any conventional arrangement of networking components, and according to one embodiment, can include a source 702 that is coupled to and otherwise communicates with an overall network 704. The network 704 in turn is coupled to a destination 706. The embodiment of FIG. 7 is exemplary, and other embodiments can include more devices, fewer devices, or devices in arrangements that differ from the arrangement of FIG. 7.

The source 702 can be any suitable electronic device and can take many forms, including but not limited to a computer, workstation, server, network computer, quantum computer, optical computer, Internet appliance, mobile device, a pager, a tablet computer, a smart sensor, application specific processing device, and the like. The source 702 as illustrated herein is merely illustrative and may take other forms.

The source 702 may also include selected components for generating and/or forwarding data packets. The components may be implemented using hardware based logic, software based logic and/or logic that is a combination of hardware and software based logic (e.g., hybrid logic). The source 702 may include a processor 714 that can include logic that can interpret, execute, and/or otherwise process information contained in, for example, a memory element 716. The information may include computer-executable instructions and/or data that may be implemented by or in one or more embodiments of the present invention. The processor 714 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor 714 may include a single core or multiple cores. Moreover, the processor 714 may include a system-on-chip (SoC) or system-in-package (SiP) design.

The source 702 may also include one or more tangible non-transitory computer-readable storage media for storing one or more computer-executable instructions or software that may be implemented by or in one or more embodiments of the present invention. The non-transitory computer-readable storage media may be, for example, a memory 716 or storage element. The memory 716 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, memristors, or other types of RAM devices.

The source 702 may also be a virtual machine (VM) for executing instructions loaded in the memory 716. The virtual machine may be provided to handle a process running on multiple processors so that the process may appear to be using only one computing resource rather than multiple computing resources. Virtualization may be employed in the source 702 so that infrastructure and resources in the source 702 may be shared dynamically. Multiple VMs may be resident on a single client device.

The source 702 may also include a network interface 718 so as to be able to interface to the network 704. The network 704 can be a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., Infini-Band, gigabit Ethernet, Myrinet) or some combination of any or all of the above. The network interface 718 may include a built-in network adapter, network interface card, personal computer memory card international association (PCMCIA) network card, card bus network adapter, wireless network adapter, universal serial bus (USB) network adapter, modem or any other device suitable for interfacing the client device to any type of network 704 capable of communication and performing the operations described herein.

The source 702 may also be coupled to one or more input devices 724, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. The source 702 may also include other suitable I/O peripherals.

A storage device 720 may also be associated with the source 702 or with any other system component. The storage device 720 may be accessible to the processor via an I/O bus. The information may be executed, interpreted, manipulated, and/or otherwise processed by the processor 714. The term storage device 720 as used herein for example with the source 702 or any other system component may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device 720. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the present application.

The storage device 720 may further store application(s) 722, and the source 702 can be running an operating system (OS). Examples of suitable operating systems may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 720 may further include rules which describe how messages should be forwarded over a communications system. The rules may be used to forward messages or information received at the source 702. Accordingly, the source 702 may serve as a forwarding device, switch, or router.

The storage device 720 may include logic for implementing one or more selected communication protocols. The communication protocol may be a protocol which provides an interface for accessing and modifying the functionality of the forwarding plane of the client device.

One or more embodiments of the present invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

FIG. 7 also illustrates the network 704 suitable for implementing one or more embodiments of the present invention. The network 704 is merely exemplary, and other embodiments can include more devices, fewer devices, or devices in arrangements that differ from the arrangement of FIG. 7.

The illustrated network 704 may transport data from a source (e.g., source 702) to a destination (e.g., destination 706). The network 704 may employ any selected combination or arrangements of network devices, such as routers, switches, firewalls, and/or servers and connections (e.g., links) (not shown) to transport data. Data may refer to any type of machine-readable information having substantially any format that may be adapted for use in one or more networks and/or with one or more devices described herein. Data may include digital information or analog information. The data may be packetized and/or non-packetized, although the present invention assumes the use of packetized data.

The network 704 may be a hardwired network using wired conductors and/or optical fibers and/or may be a wireless network using free-space optical, radio frequency (RF), and/or acoustic transmission paths. In one implementation, the network 704 may be a substantially open public network, such as the Internet. In another implementation, the network 704 may be a more restricted network, such as a corporate virtual network. The network 704 may include the Internet, intranet, Local Area Network (LAN), Wide Area Network (WAN), Metropolitan Area Network (MAN), wireless network (e.g., using IEEE 802.11), or other type of network. The network 704 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The system 700 can also include a service provider 712 that makes a service available to another component of the system. For example, the service provider 712 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The system 700 also includes the destination 706. The destination 706 may include a device that receives information over the network 704. For example, the destination 706 may be a device that receives data from the source 702. Those of ordinary skill will readily recognize that the system 700 may employ any suitable number of servers.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A computer-implemented method comprising:
   determining, using a computing device, a first-stage total bandwidth from a first network device to a second network device in a network comprising a plurality of network devices, wherein the first network device communicates with the second network device through a first set of links;
   determining, using the computing device, a second-stage total bandwidth from the second network device to a destination, wherein the second network device communicates with the destination via a plurality of paths through a second set of links;
   deriving, using the computing device, respective capacity allocations for one or more links in the first set of links between the first network device and the second network device;
   deriving, using the computing device, a total upstream capacity allocation for the second network device, for traffic from the first network device to the destination, by deriving respective capacity allocations for each of a plurality of links in the second sets of links between the second network device and the destination such that the derived total upstream capacity allocation between the first network device and the second network device is no higher than a total downstream capacity allocation between the second network device and the destination;
   calculating, using the computing device, for each of the plurality of links, a respective weight based on the derived capacity allocations; and
   distributing network traffic among the plurality of links based on the calculated weights.

2. The method of claim 1, wherein at least one of the network devices is a switch.

3. The method of claim 1, wherein the network is a multistage Clos network.

4. The method of claim 1, wherein the first network device communicates with the destination through the second network device.

5. The method of claim 1, wherein at least some traffic from the first network device to the destination uses a path between the first network device and the destination comprising at least one of the first set of links between the first network device and the second network device and at least one of the second set of links between the second network device and the destination.

6. The method of claim 1, wherein the total upstream capacity allocation for the second network device, for traffic from the first network device to the destination, is proportional to the total downstream capacity allocation from the second network device to the destination.

7. The method of claim 1, comprising:
deriving the respective capacity allocations for links in the first set of links based on the determined first-stage total bandwidth; and
deriving the respective capacity allocations for links in the second set of links based on the determined second-stage total bandwidth.

8. A non-transitory computer-readable medium storing instructions that, when executed on a processor, cause the processor to:
determine a first-stage total bandwidth from a first network device to a second network device in a network comprising a plurality of network devices, wherein the first network device communicates with the second network device through a first set of links;
determine a second-stage total bandwidth from the second network device to a destination, wherein the second network device communicates with the destination via a plurality of paths through a second set of links;
derive respective capacity allocations for one or more links in the first set of links between the first network device and the second network device;
derive a total upstream capacity allocation for the second network device, for traffic from the first network device to the destination, by deriving respective capacity allocations for each of a plurality of links in the second sets of links between the second network device and the destination such that the derived total upstream capacity allocation between the first network device and the second network device is no higher than a total downstream capacity allocation between the second network device and the destination;
calculate for each of the plurality of links, a respective weight based on the derived capacity allocations; and
distribute network traffic among the plurality of links based on the calculated weights.

9. The medium of claim 8, wherein at least one of the network devices is a switch.

10. The medium of claim 8, wherein the network is a multi-stage Clos network.

11. The medium of claim 8, wherein the first network device communicates with the destination through the second network device.

12. The medium of claim 8, wherein at least some traffic from the first network device to the destination uses a path between the first network device and the destination comprising at least one of the first set of links between the first network device and the second network device and at least one of the second set of links between the second network device and the destination.

13. The medium of claim 8, wherein the total upstream capacity allocation for the second network device, for traffic from the first network device to the destination, is proportional to the total downstream capacity allocation from the second network device to the destination.

14. The medium of claim 8, storing instructions that, when executed on a processor, cause the processor to:
derive the respective capacity allocations for links in the first set of links based on the determined first-stage total bandwidth; and
derive the respective capacity allocations for links in the second set of links based on the determined second-stage total bandwidth.

15. A system comprising:
a network comprising a plurality of network devices, the network devices including at least:
a first network device in a first stage of the network, and
a second network device in a second stage of the network, the second network device configured for communication with the first network device through a first set of links; and
a processor configured to:
determine a first-stage total bandwidth from the first network device to the second network device in the network;
determine a second-stage total bandwidth from the second network device to a destination, wherein the second network device communicates with the destination through a second set of links;
derive respective capacity allocations for one or more links in the first set of links between the first network device and the second network device;
derive a total upstream capacity allocation for the second network device, for traffic from the first network device to the destination, by deriving respective capacity allocations for each of a plurality of links in the second sets of links between the second network device and the destination such that the derived total upstream capacity allocation between the first network device and the second network device is no higher than a total downstream capacity allocation between the second network device and the destination;
calculate for each of the plurality of links, a respective weight based on the derived capacity allocations; and
distribute network traffic among the plurality of links based on the calculated weights.

16. The system of claim 15, wherein at least one of the network devices is a switch.

17. The system of claim 15, wherein the network is a multi-stage Clos network.

18. The system of claim 15, wherein at least some traffic from the first network device to the destination uses a path between the first network device and the destination comprising at least one of the first set of links between the first network device and the second network device and at least one of the second set of links between the second network device and the destination.

19. The system of claim 15, wherein the total upstream capacity allocation for the second network device, for traffic from the first network device to the destination, is proportional to the total downstream capacity allocation from the second network device to the destination.

20. The system of claim 15, the processor further configured to:
derive the respective capacity allocations for links in the first set of links based on the determined first-stage total bandwidth; and derive the respective capacity allocations for links in the second set of links based on the determined second-stage total bandwidth.

\* \* \* \* \*